Patented May 14, 1940

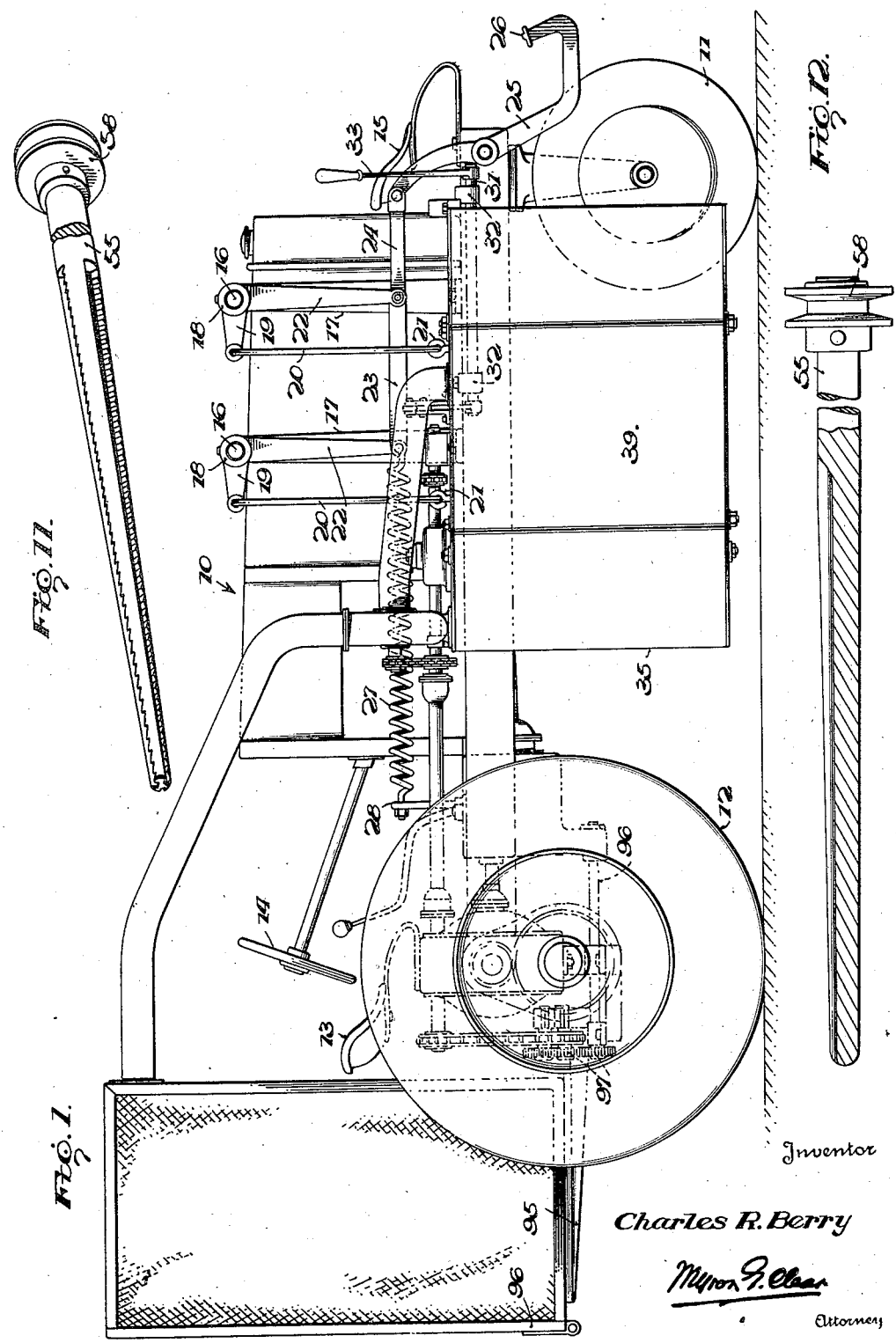

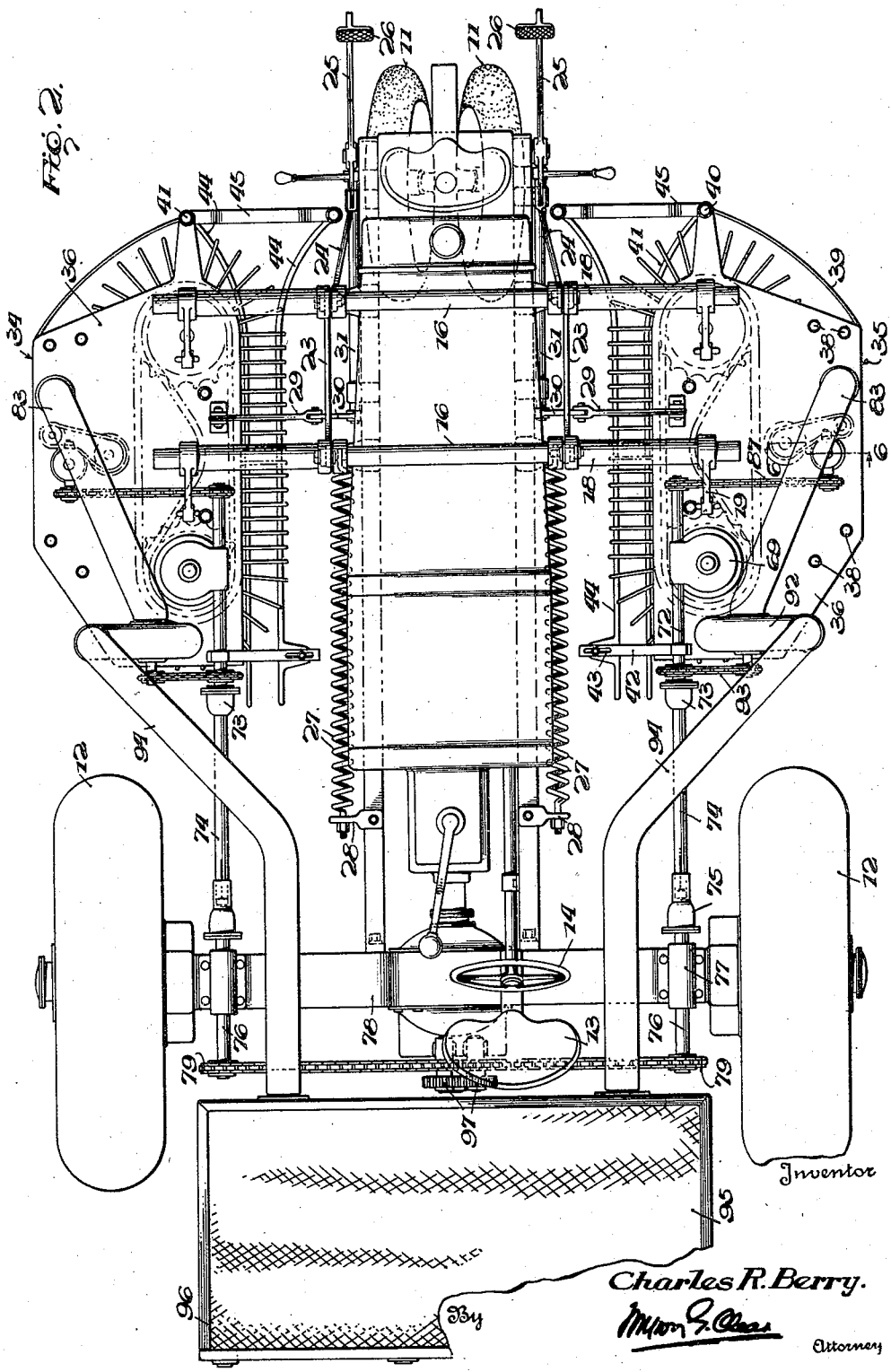

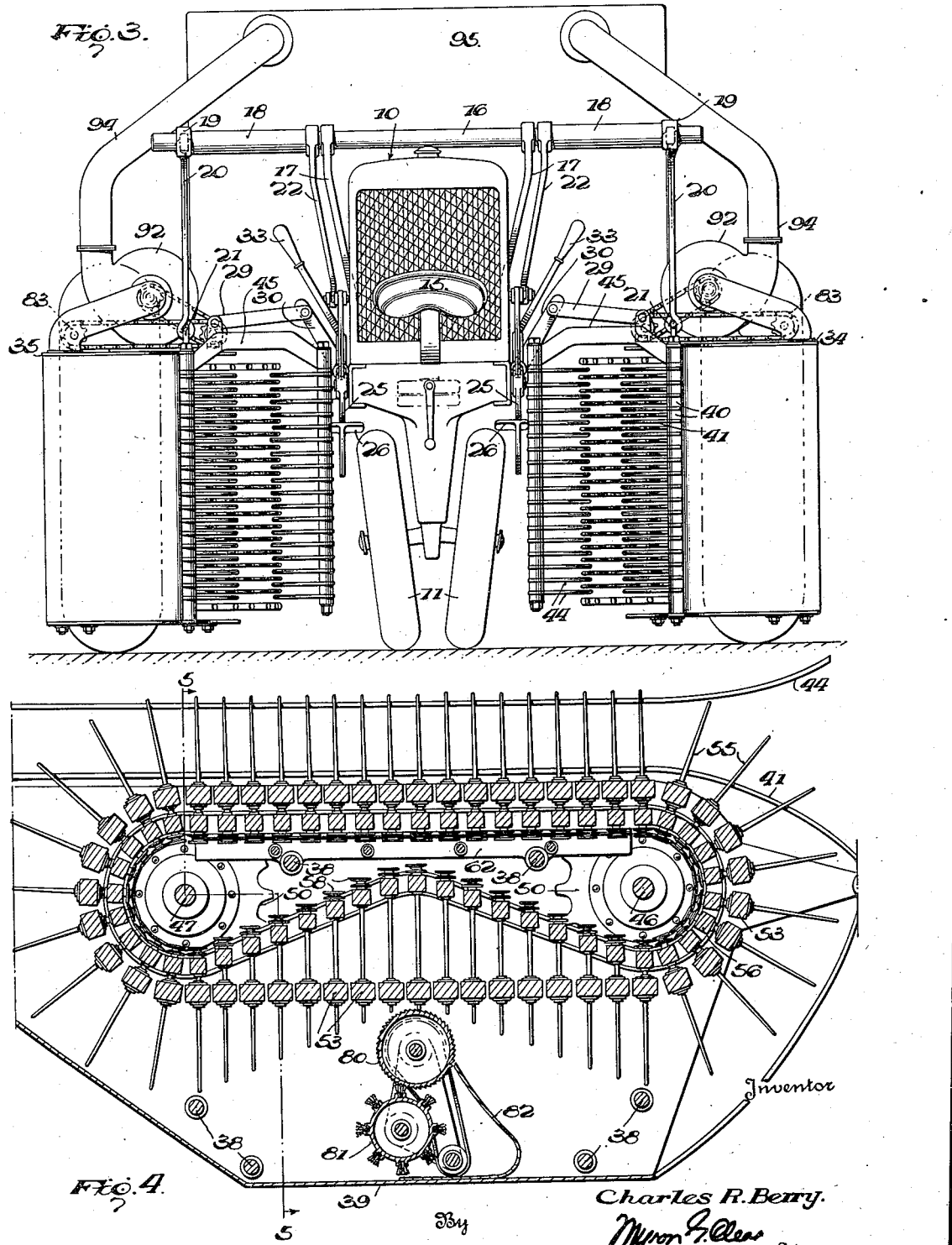

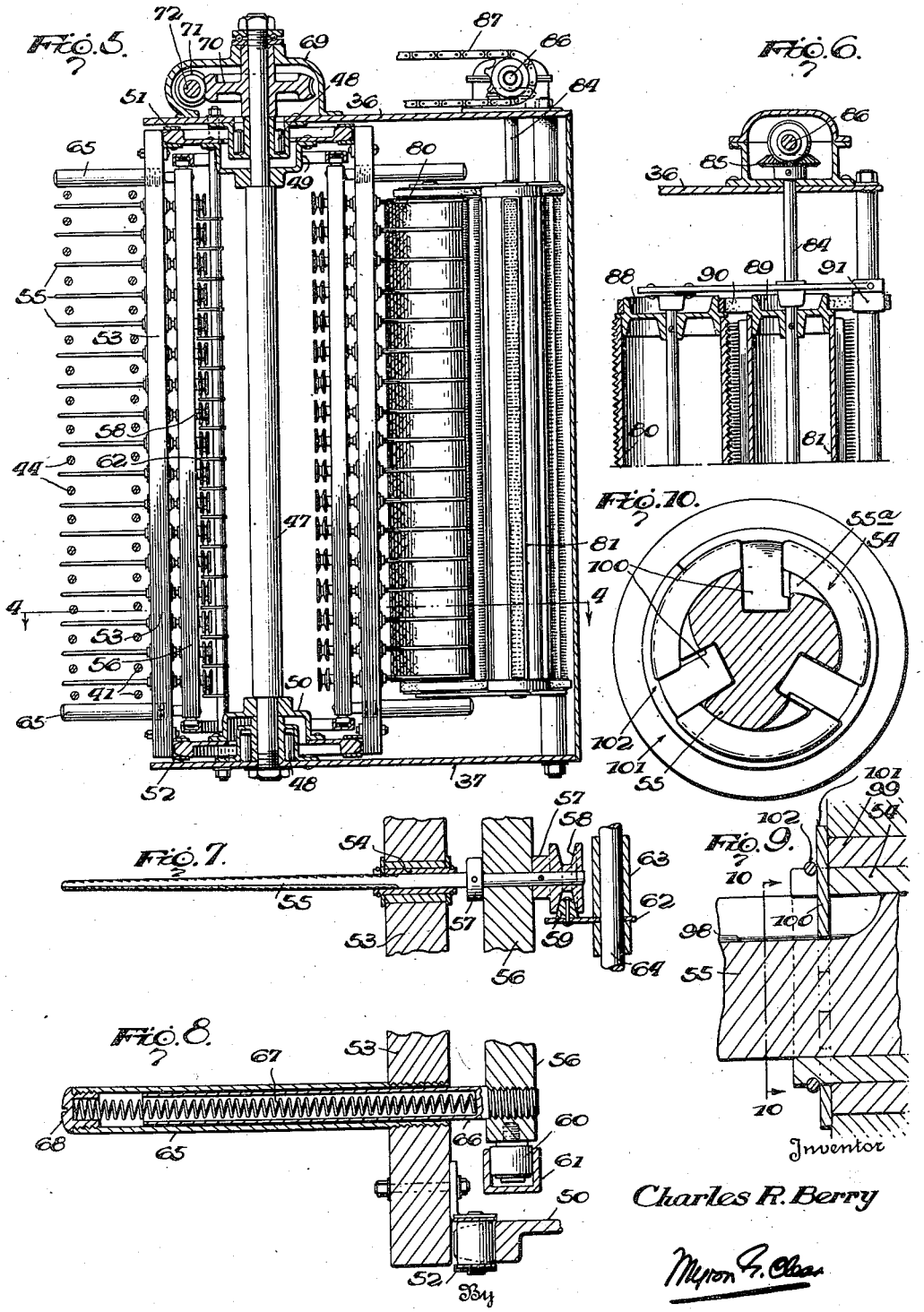

2,200,464

UNITED STATES PATENT OFFICE 2,200,464

COTTON PICKER

Charles R. Berry, Greenville, Miss., assignor to Cotton Harvester Corporation of America, Pittsburgh, Pa., a corporation of Delaware Application June 9, 1937, Serial No. 147,375

16 Claims. (Cl. 56—43)

My present invention relates generally to cotton pickers and more particularly to double row pickers, with the primary object in view to provide a practical, effective and economical machine which will fulfill all the requirements of normal field conditions.

The machine proposed by my invention is of that general nature including a pair of picker units or mechanisms supported at opposite sides of a tractor, the body of which is adapted to travel between rows of cotton plants, so that such units or mechanisms may take the adjacent two rows of plants and efficiently remove the cotton therefrom. It has been proposed to suspend the units, as thus positioned relative to the tractor, in a manner to permit the same to maintain upright positions irrespective of such lateral inclination as the tractor may assume due to inequalities in the field surface.

Due to irregularity in the planting of rows of cotton, however, it is frequently found that they vary in width as a field is traversed, converging and diverging to such an extent that it has been demonstrated lateral guidance of the picking units for this reason and vertical guidance to plant positions and heighths are essentials to full efficiency in the picking operation.

It is for the foregoing reasons that in the present machine it is an object to provide for lateral adjustment of the picking units as well as vertical adjustment thereof during operating movement of the machine, and for the purpose of these adjustments it is a further object to provide the machine as a whole with arrangements whereby an operator, other than the operator of the tractor, will handle the adjustment controls at a station where the necessities respecting adjustment will fully present themselves in a manner allowing ample time for their manipulation.

Furthermore, in such instances of two-row pickers as I am aware, the picking units or rather the picking mechanism of each unit has been somewhat complicated, so much so as to render the initial assembly as well as subsequent repair and substitution of parts very difficult, and it is for this reason a further object of my invention to provide a much simplified mechanism as well as one of increased strength and durability.

Having the foregoing more or less general objects in mind, the further specific objects as well as the construction, arrangement and operation of parts will be better understood and more thoroughly appreciated from the following detailed description of the best mode so far devised for carrying the invention into practical use, reference being made to the accompanying drawings, which form a part of this specification, and in which, Figure 1 is a side elevation of the improved machine.

Figure 2 is a top plan view thereof.

Figure 3 is a front elevation thereof.

Figure 4 is a detail horizontal sectional view through one of the picker mechanisms, taken substantially on line 4—4 of Figure 5.

Figure 5 is a vertical transverse sectional view therethrough taken substantially on line 5—5 of Figure 4.

Figure 6 is an enlarged detail sectional view through the upper portion of the mechanism or unit, taken substantially on line 6—6 of Figure 2.

Figure 7 is a detail vertical sectional view, enlarged, showing one of the picker spindles and its adjacent supports and operating parts.

Figure 8 is an enlarged detail fragmentary sectional view through one of the guide fingers and adjacent parts.

Figure 9 is an enlarged fragmentary sectional view through a portion of one of the spindles or needles and its support and cleaning means.

Figure 10 is a sectional side view taken on line 10—10 of Figure 9.

Figure 11 is a detail perspective view of one of the needles or spindles, and

Figure 12 is a partial longitudinal sectional view therethrough.

Referring now to these several figures and more particularly to Figures 1, 2 and 3, it is proposed that a tractor, generally indicated at 10, will be so equipped that its adjacent front steering wheels 11 will, like its body, travel in a field between spaced apart rows of cotton so that in the forward movement thereof in the field the rows of cotton plants will upstand at opposite sides of the tractor body and the front wheels 11, and between the same and the widely laterally spaced rear traction wheels 12.

The tractor has the usual rear seat 13 for the tractor operator, with adjacent steering control wheel 14 and, in accordance with my present proposals, a second operator's seat 15 is mounted forwardly of the tractor body, approximately over the front wheels 11 where the view forwardly over the field in practice will be unobstructed so that the control operator, thus seated, cannot fail to fully appreciate any changing conditions in the field such as necessitate either lateral or vertical adjustment of the picking units, where and as these conditions manifest themselves.

There are also mounted across the tractor body picking unit supports in the form of cylindrical bars 16 rigidly connected to the upper ends of upright brackets 17 which are, in turn, rigidly connected in any suitable manner with the tractor frame. The ends of these supporting bars project laterally beyond the tractor sides, and upon such projecting end portions are rotatable sleeves 18, at the outer ends of which are short, rigid rearwardly projecting crank arms 19. From the ends of these crank arms 19 connecting rods 20 depend to movably engage at their lower ends eye-bolts 21 upstanding in longitudinally spaced relation from the picking units to be presently described.

The rotatable sleeves 18 also have elongated depending crank arms 22 at their inner ends adjacent to the tractor sides and joined at their lower ends by connecting bars 23. The forward depending arms 22 are also movably in connection with the rear ends of forwardly extending connecting bars 24 and the forward ends of bars 24 are in pivotal connection with the upper rear ends of treadles or levers 25 fulcrumed on the tractor frame below and at opposite sides of the front seat 15. The forward lower ends of these treadles or levers 25 have foot pieces 26 so that the picking control operator seated on the front seat 15 may, by means of his feet, control the vertical positions of the two picking units either in unison or independent of one another as the conditions demand.

To the rearmost depending arms 22 are connected the forward ends of counterbalancing springs 27, which extend rearwardly along the tractor sides and are anchored at their rear ends by anchor brackets 28 rigid with the tractor frame. The tension of springs 27 is such as to normally hold the two picking units in uppermost position as, for instance, shown in Figure 1, so that when the operator presses downwardly on the foot pieces 26 the units are lowered and in any position of adjustment release of pressure by the operator permits springs 27 to raise the units.

Extending laterally inwardly from the picking units are horizontal connecting arms 29 whose inner ends are connected to the upstanding rear cranks 30 of adjusting shafts 31 journaled along the forward side portions of the tractor 10 in suitable bearings 32 supported by the tractor. To the forward ends of these adjusting shafts are secured the lower ends of adjusting levers or arms 33 which, it will be noted, upstand at the sides of the front operator's seat 15 so as to be readily grasped by the hands of the operator to shift the picking units laterally either in unison or independently as desired.

Any desired adjustment of the picking units for the purposes previously set forth may thus be quickly and easily accomplished, up and down movements being controlled by the operator's feet and lateral movements being controlled by the operator's hand.

Now, as to the picking units which have been generally designated 34 and 35, each thereof includes a top plate 36 and a bottom plate 37 rigidly connected and spaced apart by vertical stay bolts 38, the upper plate 36 of each unit supporting the previously mentioned eye bolts 21 by means of which, through the depending connecting rods 20, the units are suspended in vertically adjustable relation at opposite sides of the tractor 10. The top and bottom plates 36 and 37 of each unit are connected by a vertical wall 39 which extends along the outer side only of the unit and protects the internal mechanism and which is connected at its forward end to an upright 40.

To the upright 40 of each unit are also connected the forward laterally flared ends of a vertical series of horizontal guide bars 41 extending rearwardly along the inner open side of the unit and secured at their rear ends to an upper rigid cross arm 42. This arm 42, which extends laterally inwardly from the top plate 36 of the unit as plainly seen in Figure 2, is slotted at its inner end as at 43 to provide for the laterally adjustable support of a second vertical series of horizontal guide bars 44 which parallel the guide bars 41 in laterally inwardly spaced relation to form between the two series of guide bars of each unit a plant guiding channel. The forward ends of guide bars 44 are curved or flared inwardly toward the tractor and opposite to the curvature or flare of the guide bars 41 so as to thus form a relatively wide receiving mouth for the plants which, in the forward movement of the machine, thus pass rearwardly in the guide channels above mentioned and along the inner open sides of the picking units. The forward ends of guide bars 44 are securely fastened to an upper rigid cross arm 45 which extends laterally inwardly from the upper end of the before-mentioned upright 40.

It is obvious that, while the enlarged or widened receiving mouths of the guide or plant channels will take in cotton plants somewhat out of line in order to properly shift the same into the plant guiding channel, any material convergence or divergence of the rows of plants will necessitate lateral adjustment of the picking units under control of the forward operator.

As best seen in Figure 4, each unit has vertical front and rear shafts 46 and 47 mounted in bearings 48 attached to the top and bottom plates 36 and 37, each shaft having upper and lower horizontally disposed sprocket wheels 49 and 50. These sprocket wheels mesh with the forward and rear portions of endless upper and lower sprocket chains 51 and 52, with the links of which are securely connected the upper and lower ends of stripper bars 53, each having a vertical longitudinal series of thimbles 54 (see Figure 7) through which the picking spindles 55 project in an outward direction and are both rotatable and lengthwise shiftable, as fully explained hereinafter.

The spindles 55 are rotatably supported at their inner portions by vertical carrier bars 56 with respect to which they are held against lengthwise movement by set collars 57, the extreme inner ends of the spindles, which are in horizontal as well as vertical rows, having deeply grooved friction wheels 58. In the travel of the spindles along the inner side of the unit, the friction wheels engage and bear on stationary horizontal V-shaped friction bars 59, and thus during this portion of their circuit around the front and rear shafts 46 and 47 the spindles will be rotated on their own axes as they are projected for their full lengths transversely across the plant guide channels between guide bars 41 and 44 and as they travel with the stripper bars 53 for substantially the full length of the channel.

The upper and lower ends of the carrier bars 56 are equipped with rollers 60 which travel in upper and lower oppositely facing stationary channeled guide strips 61, which are straight along the inner open side of the unit to hold the spindles 55 at full length extension through the stripper bars 53 and, at the outer side of the unit, are centrally indented so that the carrier bars 56, and consequently the spindles, are drawn inwardly, pulling the spindles 55 lengthwise therethrough the stripper bars until the outer free ends of the spindles are immediately adjacent to the stripper bar thimbles 54 at the doffing station to be presently described.

Thus in the forward movement of the machine with the plants passing rearwardly through the guide channels, the picking spindles round the front shaft 46 and pass through the plants and rearwardly therewith entirely across the plant guide channels by reason of their extension for their full lengths beyond the stripper bars 53. During this entire movement of the picking fingers which is regulated by the gearing to the approximate speed of forward movement of the machine so as to eliminate any movement of the spindles lengthwise of the channels relative to the plants, the spindles are in constant rotation by reason of the engagement of their friction wheels 58 with the friction bars 59. It will be noted from Figure 7 that each friction bar 59 is supported by a spring metal or other resilient strip 62 disposed between collars or spacers 63 around supporting uprights 64 to thus relieve the spindles from strain due to the pressure of the frictional engagement while insuring the efficiency of the frictional contact.

To relieve the spindles of strain which might result from their movement by the stripper bars 53, each stripper bar has above and below its series of spindles fixed, outwardly projecting tubular guide fingers 65, as seen in Figure 8. Into each finger 65 the hollow portion of a tubular plunger 66, fixed to the corresponding carrier bar 56, slidably interfits and within each plunger is a compression spring 67 whose opposite ends respectively abut the plunger and a plug 68 closing the outer end of the respective guide finger 65. Thus the plungers and guide fingers are closed to the entrance of dirt and debris and serve to so connect each stripper bar and its respective carrier bar as to take the strain of their circuit movements from the picking needles, while the springs 67 take the strain from those portions of the channeled guide rails 61, which would otherwise result during the pulling of fingers inwardly as they pass to the doffing station centrally of the outer run of the picking needles while the cotton is shifted lengthwise of the needles to the extremities thereof.

The rear shaft 47 upstands above the top plate 36 within and through an upper gear casing 69 in which it supports a worm wheel 70 engaged by the worm 71 of an upper longitudinal shaft 72, see Figures 2 and 5. This shaft extends to the rear of the unit and is connected by a universal joint 73 to the forward end of an intermediate shaft 74 universally jointed at 75 to a rear shaft 76 mounted in a bearing 77 of the rear axle 78 of the tractor and connected by a chain 79 and sprockets, or equivalent mechanical connections, to the rear portion of the tractor power shaft 97, through gearing 98, as best seen in Figures 1 and 2, so that during operation each picking unit is driven from the tractor in a manner to function as previously explained.

At the doffing station of each unit a vertically disposed doffing cylinder 80 has peripheral teeth inclined in the direction of rotation of the cylinder to take the cotton off the retracted spindles, which cotton as thus removed by the cylinder is detached from the latter by the action of a relatively faster rotating brush drum 81 in the flaring mouth 82 of a suction line, which includes a suction pipe 83 extending rearwardly from the upper end of flaring mouth 82, as will be plain by a comparison of Figures 2 and 4. The brush drum 81 has an upstanding shaft 84, the upper end of which is connected by meshing gears 85, with a short horizontal shaft 86 connected by pulleys and a belt 87 with the spindle operating shaft 72 before referred to.

As seen in Figure 6, the upper ends of the doffing cylinder 80 and brush drum 81 carry pulleys 88 and 89, the pulley 88 being connected by a belt 90 with an idler 91. The pulley 89 of the brush drum 81 directly driven as above bears against belt 90 to thus drive the doffing cylinder at substantially reduced speed, and so that the rapidly rotating drum 81 operates against cylinder 80 in the direction of inclination of its peripheral teeth, the drum rotating clockwise and the cylinder counterclockwise.

The suction pipe 83 extends from the central intake of a fan casing 92, the fan shaft being driven by a belt 93 from the spindle operating shaft 72 as seen in Figure 2. From the peripheral outlet of fan casing a flexible pipe 94 leads to a rearmost collecting chamber 95, preferably a large screened casing supported at the rear of the tractor 10 with a rear let-down door 96 providing for ready, easy and quick discharge of its contents as it fills during operation.

Thus in operation, as previously described, cotton on the plants within the plant guide channel is wrapped around the rotating spindles and in this way withdrawn from the bolls in a manner well known in machines of the spindle type. As the spindles reach the rear shaft and round the same, they pass from the friction bars and cease rotating so that, in the course of their further movement along the outer run of the circuit, the cotton is forced to the ends of the spindles against the thimbles 54 as the spindles are withdrawn inwardly of the stripper bars, leaving the cotton at the extreme ends of the spindles for ready removal therefrom by the doffing cylinder 80, from which it is removed in turn by the brush drum 81 within the suction mouth for ready transport through suction pipe 83, the fan casing 92 and blast pipe 94 to the collecting chamber in casing 95.

For accomplishing the foregoing, the picking units have, by the present invention, been formed in a simple manner, rendering their initial assembly as well as subsequent repair and substitution of parts an easy operation as compared with mechanism of this character known at the present time. The invention further obviously provides for such adjustments of the picking units with respect to the tractor as will, to the fullest extent, insure effective picking action of the spindle under normal field conditions, as well as by a special control operator whose position enables him to quickly survey the conditions necessitating adjustment and permits him to easily meet the requirements in point of time according to the demands.

By referring to Figures 10, 11 and 12, it will be noted each of the spindles or needles 55 has series of teeth 55ª, each series along one side of a lengthwise groove 98 of a depth greater than the depth of the teeth. The bases of these grooves 98, it will be noted, are parallel with the axis of the needle and thus the thimble 54 of each needle may rotate with the needle in a bearing 99 of the stripper bar 52 supporting the same, and provision may be made to support the needle against lateral vibration as its tapering portion is drawn inwardly through the thimble during approach to the doffing station.

For the above purpose, the outer end of each thimble 54 is slotted, the slots thereof being opposite the grooves 98 of the needle, to receive the inwardly projecting clearing and supporting fingers 100, of a washer or collar 101 held in seated relation around the slotted end of the thimble by a spring ring 102, all as plainly seen in Figures 9 and 10. These clearing fingers 100, as also plainly seen, extend to the bases of the needle grooves 98 so that the needle cannot vibrate even when its tapering portion is relatively loose within the thimble 54. It will be noted from Figure 10, that the clearing fingers 100 are cut away at one side to avoid contact with the needle teeth 55a and will not only serve as effective lateral supports for the needle, but during each lengthwise movement of the needle will rake out the grooves 98 thereof so as to avoid accumulation of gum and fibres from the cotton. It has been found that unless this is done the grooves of the needles soon fill up with gum and fibres from the cotton to an extent which seriously impairs the aggressiveness and efficiency of the needle teeth with consequent reduction in efficiency of the picking operation. With the present arrangement, this is not permited to occur, the needles being maintained in a clean aggressive condition at all times by reason of the scraping of the grooves during each lengthwise movement thereof incident to the removal of cotton just previously picked thereby.

What is claimed is:

1. In a cotton picker, a tractor, picking units mounted at opposite sides of said tractor, flexible suspension means carried by the tractor and supporting said units and manually controlled means for swingingly adjusting said units laterally on said suspension means with respect to the tractor during operation of the picker, and manually controlled means operating through said suspension means for raising and lowering the units during operation.

2. In a cotton picker, a tractor, picking units having laterally swinging suspension connections at opposite sides of said tractor, a control station including an operator's seat at the front of the tractor, and means effective at said control station for swingingly adjusting the units on said connections laterally with respect to the tractor during operation of the picker.

3. In a cotton picker, a tractor, picking units suspended therefrom at its opposite sides and in spaced relation thereto, a control station including an operator's seat at the front of the tractor, and mechanism operable at said control station including foot levers at opposite sides of said seat for adjusting said units vertically and hand levers at opposite sides of the seat for shifting the units laterally toward and away from the tractor.

4. In a cotton picker, a tractor, cross bars fixed thereto and extending laterally thereof beyond its opposite sides, sleeves rotatable on said crossbars and having cranks at the inner and outer ends thereof, suspension rods depending from the outer cranks, picking units attached to the lower ends of said rods, springs anchored on the tractor and engaging the inner sleeve cranks for rotating the latter in a direction to raise the units, and manually operable levers connected to the latter cranks for rotating the sleeves to lower the units against the tension of said springs.

5. In a cotton picker, a tractor, picking units at oposite sides thereof, means swingingly suspending said units for adjustment horizontally toward and away from the tractor, a control station at the front of the tractor, shafts journaled longitudinally of the tractor and having rear cranks, connecting rods between said cranks and the picking units, and manually operable levers connected to the forward ends of said cranks for adjusting the units horizontally on said suspension means.

6. In a cotton picker, a picking unit including an endless series of bars, a series of spindles movable with each bar and rotatable and endwise movable with respect thereto, endless carrier chains for supporting and moving said bars, a second series of bars opposite the first bars and in which the spindles are rotatable and held against endwise movement, means for shifting the second bars toward and away from the first bars to extend and retract the spindles, friction wheels carried by said spindles and having V-shaped grooves, and friction bars resiliently supported in the path of said wheels and having tapering sides to interfit the grooves of said friction wheels for a portion of the movement thereof.

7. In a cotton picker, a picking unit including a series of stripper bars, endless chains for supporting and moving said bars, a series of spindles movable with each bar and rotatable and lengthwise movable with respect thereto, a series of spindle bars opposite to, and movable with, the stripper bars and in which the spindles are rotatable and held against longitudinal movement, means for moving said spindle bars toward and away from the stripper bars, and guide means adjustably connecting the stripper bars and the spindle bars and having spring means normally urging the latter away from the former.

8. In a cotton picker, a picking unit including a series of stripper bars, endless chains for supporting and moving said bars, a series of spindles movable with each bar and rotatable and lengthwise movable with respect thereto, a series of spindle bars opposite to, and movable with, the stripper bars and in which the spindles are rotatable and held against longitudinal movement, means for moving said spindle bars toward and away from the stripper bars, tubular guide fingers carried by said stripper bars and closed at their outer free ends, and guide plungers carried by the spindle bars and slidably interfitting said guide fingers.

9. In a cotton picker, a picking unit including a series of stripper bars, endless chains for supporting and moving said bars, a series of spindles movable with each bar and rotatable and lengthwise movable with respect thereto, a series of spindle bars opposite to, and movable with, the stripper bars and in which the spindles are rotatable and held against longitudinal movement, means for moving said spindle bars toward and away from the stripper bars, tubular guide fingers rigidly outstanding from the stripper bars, hollow plungers carried by the spindle bars and slidably interfitting said fingers, compression springs in said plungers, and caps closing the outer ends of said fingers and against which the springs bear for the purpose set forth.

10. In a cotton picker, a picking unit including a series of upright stripper bars, endless carrier chains supporting and moving said bars, means for actuating said carrier chains, a series of spindles movable with each bar and rotatable and lengthwise movable with respect thereto, a series of spindle bars movable with said stripper bars and adjustable toward and away therefrom, said spindle bars rotatably supporting the spindles against lengthwise movement means with which the spindles are engageable during a portion of their movement for rotating the spindles, means for adjusting the spindle bars toward and away from the stripper bars to retract the spindles with respect to the stripper bars at another point in their travel, and means at said latter point for removing cotton from the retracted spindles.

11. In a cotton picker, a picking unit including a series of upright stripper bars, endless carrier chains supporting and moving said bars, means for actuating said carrier chains, a series of spindles movable with each bar and rotatable and lengthwise movable with respect thereto, a series of spindle bars movable with said stripper bars and adjustable toward and away therefrom, said spindle bars rotatably supporting the spindles against lengthwise movement means with which the spindles are engageable during a portion of their movement for rotating the spindles, means for adjusting the spindle bars toward and away from the stripper bars to retract the spindles with respect to the stripper bars at another point in their travel, means at said latter point for removing cotton from the retracted spindles including a doffing cylinder having a toothed surface the teeth of which incline in the direction of rotation of the cylinder, and a brush roll rotating against said cylinder in the direction of inclination of said teeth and at substantially greater surface speed.

12. In a picking unit, tapering spindles having grooves the bases of which are parallel to the axis of the spindle, stripper bars through which the spindles are lengthwise shiftable, thimbles around the spindles having rotatable bearing in said bars and having radially slotted end portions, and means carried by the thimbles having clearing fingers extending through said slots into said spindle grooves and into contact with the bases of the grooves to support the spindles against vibration and clean out the grooves during each lengthwise movement of the spindles.

13. In a picking unit, tapering spindles having grooves whose bases parallel the spindle axis, stripper bars through which the spindles are rotatable and lengthwise shiftable, means for rotating the spindles, means for shifting the spindles lengthwise, bearing thimbles rotatable in respect to the stripper bars and having radially slotted portions, clearing rings on said thimbles having clearing fingers extending through the thimble slots into the spindle grooves for supporting the spindles against lateral vibration and for clearing the spindle grooves during each lengthwise movement thereof.

14. In a picking unit, endless series of spindle supports, spindles carried by said supports and rotatable and lengthwise shiftable with respect thereto, spaced apart guiding and driving means for said spindle supports arranged to form a picking run thereof along one side of the unit, means frictionally engageable by the spindle along said picking run to rotate the spindle throughout said run, and means engaging the spindle for shifting the same lengthwise at the opposite side of the unit.

15. In a picking unit, endless series of spindle supports, spaced apart driving and guiding means therefor arranged to form a picking run thereof lengthwise of the unit along one side thereof, spindles carried by said supports and having tapering longitudinally grooved portions, means for rotating the spindles in said supports throughout the picking run thereof, means for shifting the spindles lengthwise with respect to said supports at the opposite side of the unit, and means carried by the supports to prevent lateral vibration of the spindles in said supports and clear the needle grooves during each lengthwise shifting movement thereof.

16. In a cotton picker, a picking unit including an endless horizontally movable series of stripper bars, a similar endless series of spindle bars inwardly of the series of stripper bars, each of said spindle bars being opposite to and movable in unison with one of said stripper bars, a vertical series of spindles rotatable horizontally through each stripper bar and the corresponding spindle bar, said spindles being also lengthwise movable through the stripper bars and supported by the spindle bars against lengthwise movement with respect thereto, means supporting and moving said series of bars arranged to form a picking run along one side of the unit, means with which the spindles are in engagement along said picking run for rotating the spindles, and means effective at the opposite side of the unit for shifting the spindle bars laterally away from the stripper bars for retracting the spindles lengthwise through said stripper bars while said spindles are rotatively at rest.

CHARLES R. BERRY.